(12) United States Patent
Ferren et al.

(10) Patent No.: US 9,262,531 B2
(45) Date of Patent: Feb. 16, 2016

(54) SYSTEM AND METHOD FOR CHAT MESSAGE PRIORITIZATION AND HIGHLIGHTING

(75) Inventors: Bran Ferren, Beverly Hills, CA (US); Dimitri Negroponte, Los Angeles, CA (US)

(73) Assignee: APPLIED MINDS, LLC, Glendale, CA (US)

( * ) Notice: Subject to any disclaimer, the term of this patent is extended or adjusted under 35 U.S.C. 154(b) by 506 days.

(21) Appl. No.: 12/842,882

(22) Filed: Jul. 23, 2010

(65) Prior Publication Data

US 2012/0023113 A1 Jan. 26, 2012

(51) Int. Cl.
*G06F 7/00* (2006.01)
*G06F 17/30* (2006.01)

(52) U.S. Cl.
CPC .............................. *G06F 17/30867* (2013.01)

(58) Field of Classification Search
CPC ..... G06F 17/30; G06F 17/30867; G06F 3/00; G06F 3/048
See application file for complete search history.

(56) References Cited

U.S. PATENT DOCUMENTS

| | | | |
|---|---|---|---|
| 2004/0064514 A1* | 4/2004 | Daniell et al. | 709/206 |
| 2004/0128353 A1* | 7/2004 | Goodman et al. | 709/204 |
| 2008/0028031 A1* | 1/2008 | Bailey et al. | 709/207 |
| 2009/0100141 A1* | 4/2009 | Kirkland et al. | 709/206 |
| 2009/0106695 A1* | 4/2009 | Perry et al. | 715/816 |
| 2009/0199111 A1* | 8/2009 | Emori et al. | 715/758 |
| 2010/0175003 A1* | 7/2010 | Castellucci | 715/758 |
| 2010/0299393 A1* | 11/2010 | O'Sullivan et al. | 709/206 |
| 2011/0119258 A1* | 5/2011 | Forutanpour et al. | 707/723 |

* cited by examiner

*Primary Examiner* — Azam Cheema
(74) *Attorney, Agent, or Firm* — Michael A. Glenn; Perkins Coie LLP

(57) ABSTRACT

A system and method is provided for chat message prioritization that uses a combination of machine-derived and user-supplied relevancy criteria to present a filtered, annotated, and/or highlighted chat stream.

20 Claims, 4 Drawing Sheets

SYSTEM AND METHOD FOR CHAT MESSAGE PRIORITIZATION AND HIGHLIGHTING

STATEMENT OF GOVERNMENT RIGHTS

This invention was made with Government support under Contract No. FA9453-06-D-0103, Delivery Order 3, awarded by the U.S. Air Force. The Government has certain rights in the invention.

BACKGROUND OF THE INVENTION

1. Technical Field

The invention relates to chat messaging. More particularly, the invention relates to automatically and manually prioritizing and highlighting chat messages on a computer display device, so that the user's attention is drawn to particular content or senders.

2. Description of the Prior Art

Chat rooms have become a common form of communication, not only for social users but also to foster rapid, networked information sharing and discussion in large private and government organizations. Chat rooms have proven particularly useful for disseminating and discussing rapidly changing real-time situations, as evidenced by their widespread adoption in military command centers.

A typical chat session consists of textual messages from a sender to one or more recipients, who view both sent and received messages in a chat client that provides a "chat room" window on a computer screen. Typically, a message is composed and then sent using a mouse click or key press, after which time it becomes visible to all users logged into the particular chat room. As new messages appear and the chat window fills with text, the oldest messages are scrolled or otherwise displayed from the window.

It is not uncommon for a command center technician or operator to have several chat windows open at a given time, each monitoring a separate session with its own participants and context. The constant flow of textual information in simultaneous multiple sessions makes it difficult and time-consuming for a single user to effectively monitor incoming messages and determine which, if any, merit further thought and response. Without reading through all chat threads in their entirety, an operator may miss relevant and important incoming messages, making it likely that important information will be missed when the operator's attention is pulled away from a specific chat room to perform some other mission function.

Limited attempts have been made to alleviate this problem by highlighting specific categories or sources of information. For example, certain chat clients, such as Chocoa (Fujitsu Corporation, Tokyo, Japan) or MITRE's Dynamic Chat Manager (MITRE Corporation, Bedford, Mass. and McLean, Va.) allow users to specify keywords that are then highlighted whenever they arise in a session. The latter program also highlights chat rooms with high activity level and messages from members of a user's social network, as derived from the frequency of interaction between pairs of users.

SUMMARY OF THE INVENTION

A system and method is provided for chat message prioritization that uses a combination of machine-derived and user-supplied relevancy criteria to present a filtered, annotated, and/or highlighted chat stream.

DETAILED DESCRIPTION OF THE INVENTION

Overview

A system and method is provided for achieving a deeper and more intelligent level of prioritization and improved techniques of highlighting. Specifically, a system and method for chat prioritization is provided that uses a combination of machine-derived and user-supplied relevancy criteria to present a filtered, annotated, and/or highlighted chat stream.

In an embodiment, a chat client computes a score for each message based on a number of factors and highlights particular messages based on the score and user preferences with the purpose of helping operators identify and focus on particularly relevant chat messages. In an embodiment, a highlighted message may contain one or more visual indicators on the chat message itself and/or actuate on the chat client by the chat message an audible signal that is intended to be heard by the user.

An embodiment consists of two major parts: a computational back end and a front end display.

Computational Back End

In an embodiment, the computational back end is a system, comprising one or more processors and associated memory containing software instructions, residing on a central server, on a local user's computer or computers, or on a combination of these locations. The system uses various data to calculate the relevance and importance of an incoming message's content and sender to the user, e.g. by calculating one or more numerical scores as a measure of priority.

Login and Identification

Figure 1:
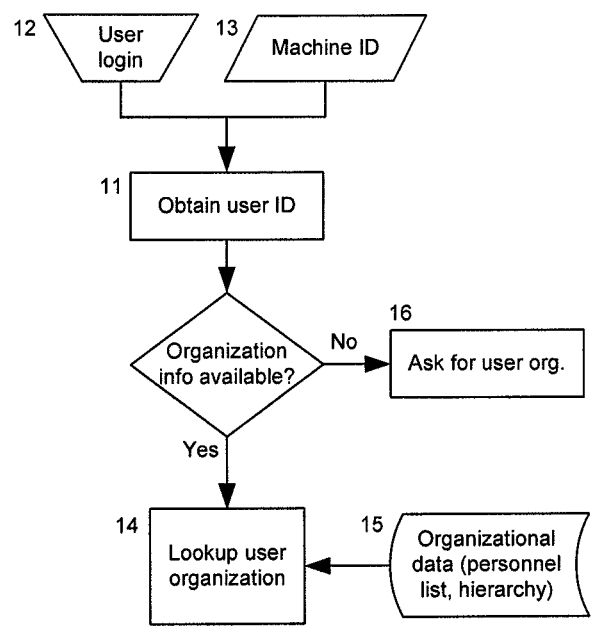
FIG. 1 is a flow diagram depicting the user login and identification process, according to an embodiment.

FIG. 1 depicts an embodiment of a process of user login and identification.

At step 11, the user identity is obtained. For example, user identity may be collected via a login operation 12, such as by manual entry or by swiping an appropriate ID card to electronically confirm identification. Alternatively, user identity may be inferred from the identity 13 of the machine on which the client is executed.

At step 14, the organization or group the user is associated with is obtained. This information may be collected at the login process 11 or the user identity may be looked up against organizational data 15, such as a personnel list and/or organizational hierarchy. If such data is not available, the user may be asked 16, e.g. on first use, to enter or select an organization/group with which he or she desires to be identified.

Chat Message Analysis and Prioritization

Figure 2:
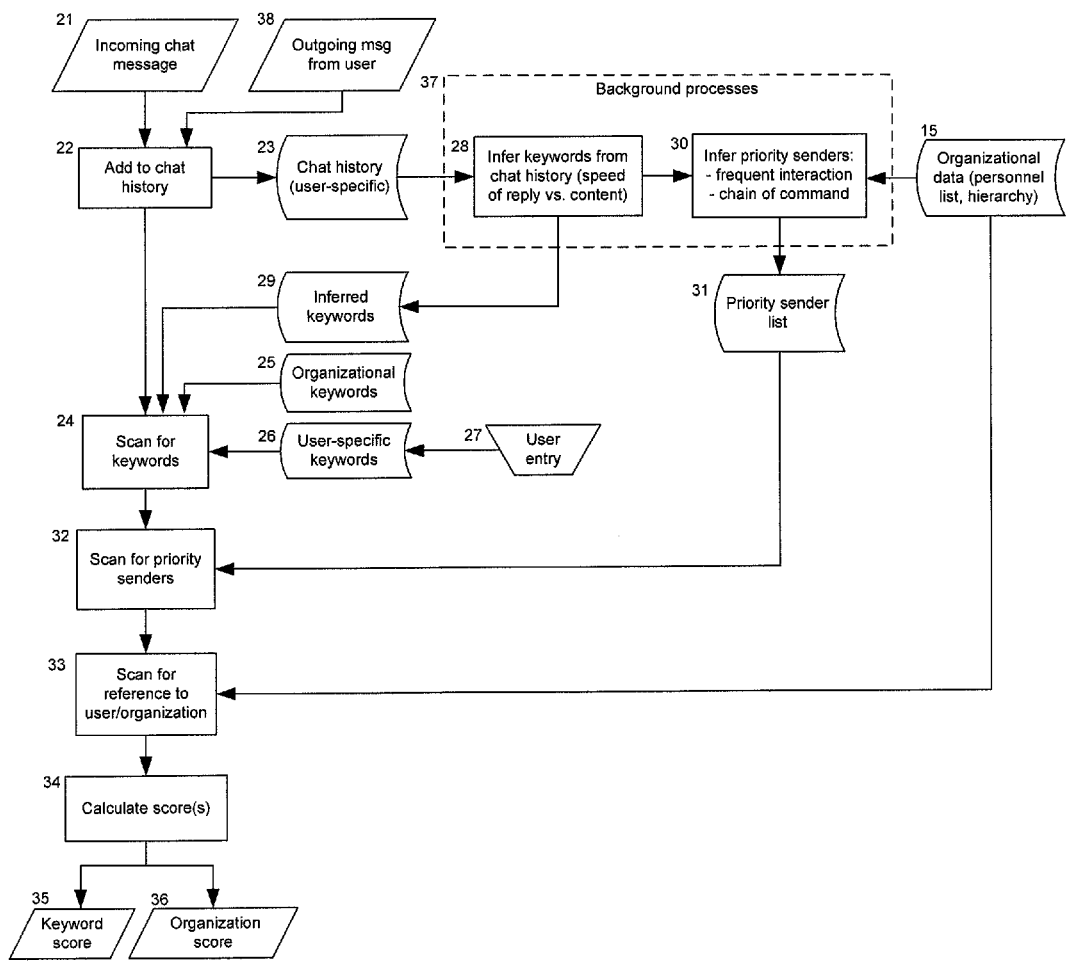
FIG. 2 is a flow diagram depicting factors considered in a process for prioritizing messages, according to an embodiment.

An embodiment of a process of prioritizing messages performed by the system can be described with reference to FIG. 2, hereinbelow. It should be appreciated that the process is by way of example only and that one skilled in the art can contemplate adding or deleting other steps or reordering the steps, for example, and still be within the scope and spirit of the claimed subject matter.

Build Chat History

An important component of comprehensive prioritization is a user-specific store of historical information. Data on each incoming chat message 21 is added 22 to the chat history 23 stored in permanent memory. Chat history data include, but are not limited to, message content, sender identity, destination chat room, and the timestamp when the message was sent. The timestamps of any outgoing messages 38 sent from the user are also recorded.

This data may be analyzed and interpreted by the system to achieve organization-wide objectives or goals. For example, in an embodiment, such data may be analyzed to identify other users from which and to which the current user frequently receives or transmits messages. Thus, the chat history data allows the system to infer and build a model of the network of relationships between users. This model aids the system in assessing the priority of an incoming message to the user by considering the importance of the relationship between the sender and the user.

Additionally, the content of each message may be correlated with how frequently and rapidly the user replies to messages containing that content, thus identifying content likely to be seen as important by the user. For example, the system may note that the user replies within 20 seconds 90% of the time when the term "JP4" appears in a message, while messages not containing that term are replied to less frequently or not at all Scan for Keywords The system scans 24 each chat message for keywords stored in memory that, when present, may elevate the message to a higher priority. The list of keywords may be a standardized list 25 that is distributed organization-wide. Additionally, the list of keywords may be a customized list 26 manually generated by the user, for example by using an onscreen form to either manually enter keywords 27 or select them from a dictionary or other list. Optionally, the list of keywords may be a combination of the aforementioned two lists, e.g. a standardized list extended by the user.

Additionally, keywords may also be inferred 28 from messages selected from within the chat history 23 that are either (a) sent by the user or (b) replied to by the user. More specifically, the system may determine keywords based on the chat history data. For example, a particular word that appears in multiple messages to which the user promptly replied and also appears in a significant number of messages sent by the user may be inferred to be a viable keyword. As noted above, the system may note that messages containing the term "JP4" are replied to within 20 seconds 90% of the time, whereas other messages are replied to in an average time of 90 seconds or not at all. Common or transition words (e.g. stop words such as "a" or "the") may be excluded from the analysis. Inferred keywords are stored in accessible memory 29.

Update Priority Senders List

From the chat history data, the system also analyzes 30 how frequently and quickly the user typically responds to a particular sender's messages. A list 31 is built and updated of senders whose messages generate rapid and frequent replies from the user. The sender of each incoming message 21 is compared 32 to this list. Both the keyword and priority sender analyses described above may be conducted as background or periodic processes 37.

Scan for User/Organization Reference

Each chat message 21 is also scanned 33 for reference to the user's identification, job title or position title, or organization. The personnel table and/or organization chart 15 may be used to obtain such data as the chain of command of the user with respect to the sender or vice-versa. For example, if a particular sender is in the line of authority directly above the user, then messages from this sender may be inferred to be of high priority. This prioritization would be further reinforced if the chat history indicated that the user tends to reply quickly and consistently to this sender's messages. As well, each chat message 21 may also be scanned 33 for reference to the sender's identification, the sender's job title or position title, the organization of the sender, and the like.

Additionally, if the particular user's designation or position title (for example, Sales VP, CEO, or Vice JCS) or name is referenced in the message, the message may be assigned a higher score. As another example, if the message is from the headquarters of the user's organization, from a higher headquarters, or an important organization rarely heard from, such a message may be more highly scored. It should be appreciated that one skilled in the art can contemplate a wide variety of ways to scan and parse a message to achieve objectives and goals of an organization.

Compute Score(s)

For each message, the above factors, as well as others contemplated by those skilled in the state of the art, are then used to calculate 34 one or more numerical scores, which are then used to assign one or more priorities to each message. The calculation may consist of a simple addition, such as 1 point for each keyword found, for example. Alternatively, weights or multiples of points may be assigned to emphasize or deemphasize particular factors. For example, references to keywords may be multiplied by 0.20 to reduce their influence, while messages from priority senders assigned 10 points. As another example, keywords may be weighted based on the frequency in which they appear, especially in messages referencing the user or his organization.

In an embodiment, several scores may be generated and assigned to the message to govern numerous modes of highlighting and notification. For example, a "keyword relevance" score 35 may be calculated based on the number of keywords found in the message, while a second "organizational relevance" score 36 may be generated and assigned based on where the message originated, for example, or if the message references the user or his mission, as another example.

Front End Display and Notification

Figure 3:
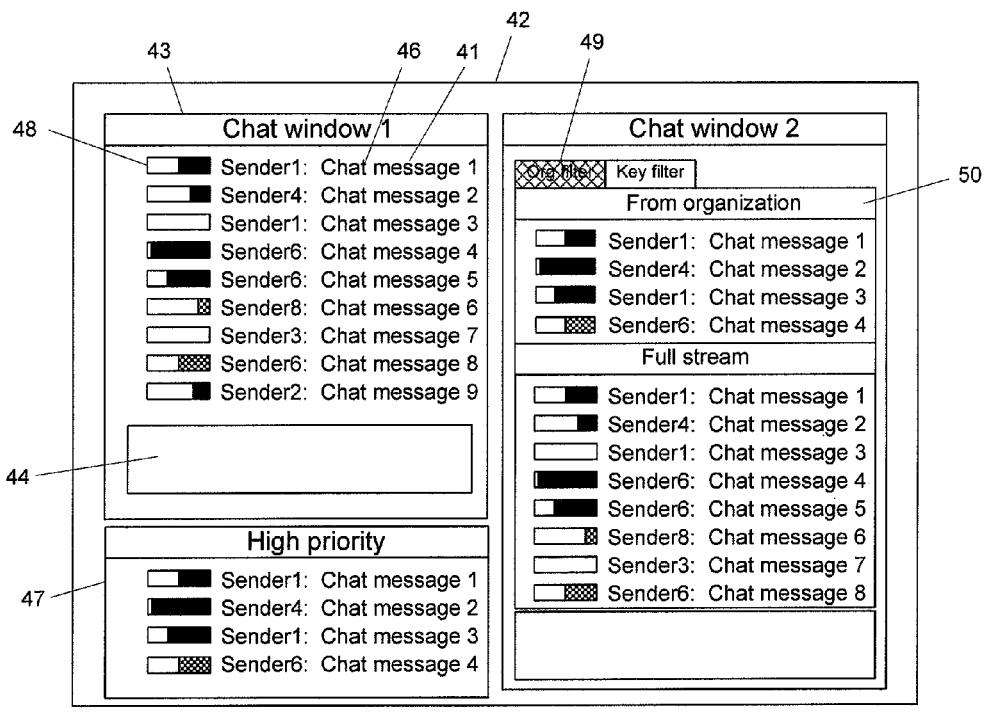
FIG. 3 depicts chat room windows with highlighting and notification, according to an embodiment.

An embodiment of a display of chat room windows with highlighting and notification can be described with reference to FIG. 3. Text messages 41 appear on a display 42 for the user, typically in a window 43 on which messages scroll from bottom to top and containing an area 44 in which the user can compose a message. Messages are graphically highlighted by the system based on the numerical score or scores determined by the computational back end. Highlighting may be of many forms, including text color, font size, adjacent symbols such as bar graphs, and text effects such as flashing or pulsing. For example, Chat message 1 (item 46 of FIG. 2) can be red, while the remaining chat messages in Chat window 1 are blue.

In an embodiment, highlighted messages may appear in a separate, high priority window 47 in addition to being shown in the main chat windows. Alternatively, the chat window may have a series of buttons or tabs 49, which when selected subdivide the chat window to display a subset 50 of the chat messages alongside the unfiltered chat stream. Examples of filters may be messages from within the user's or another specified organization (such as a headquarters), from a particular sender, or containing a specific keyword.

In addition, audio cues, such as tones or synthesized/recorded words, may be used when a high-scored message appears, prompting the user to look for the message in one of the chat windows.

Highlighting Schemes In various embodiments, highlighting schemes may be as follows:

In an embodiment, the color of the text is highlighted if the message contains keywords. For example, the entire message can be highlighted or, as another example, just the keywords are highlighted. Several colors may be used, with the particular color selected based on the priority score. For example, a low-scored message may appear in dark green against a black background for low contrast, while a somewhat higher-scored message may be colored light green for a moderate degree of contrast, and a message with a still higher score may be colored red or white for a high degree of contrast.

In an embodiment, horizontally oriented bar graphs 48 are rendered adjacent to each message to indicate one or more scores. Such use of horizontally oriented bar graphs may depend on user or organizational preference. In one embodiment, the color of the bar graph indicates the organizational score of the message; for example, green may indicate moderately scored messages from within the recipient's organization. Red, on the other hand, may indicate highly scored messages sent from headquarters or other higher organizations, from supervisors or from others in the user's chain of command. Or, red may indicate, for example, that a reference to the specific user, e.g. identified by the user's name or designation in the message, was made within the message.

In an embodiment, the length of the bar graph indicates relevance of the message based on the relevance score computed by the back end.

Therefore, in an embodiment, a low priority message would typically appear in conventional text with no or minimal bar graph, while a high-scored message might appear with highlighted text or keywords and a prominent bar graph.

It should be appreciated that the above highlighting and notification conventions, such as which text is highlighted and what bar graphs indicate, may be customized by the organization or the user.

An Example Machine Overview

Figure 4:
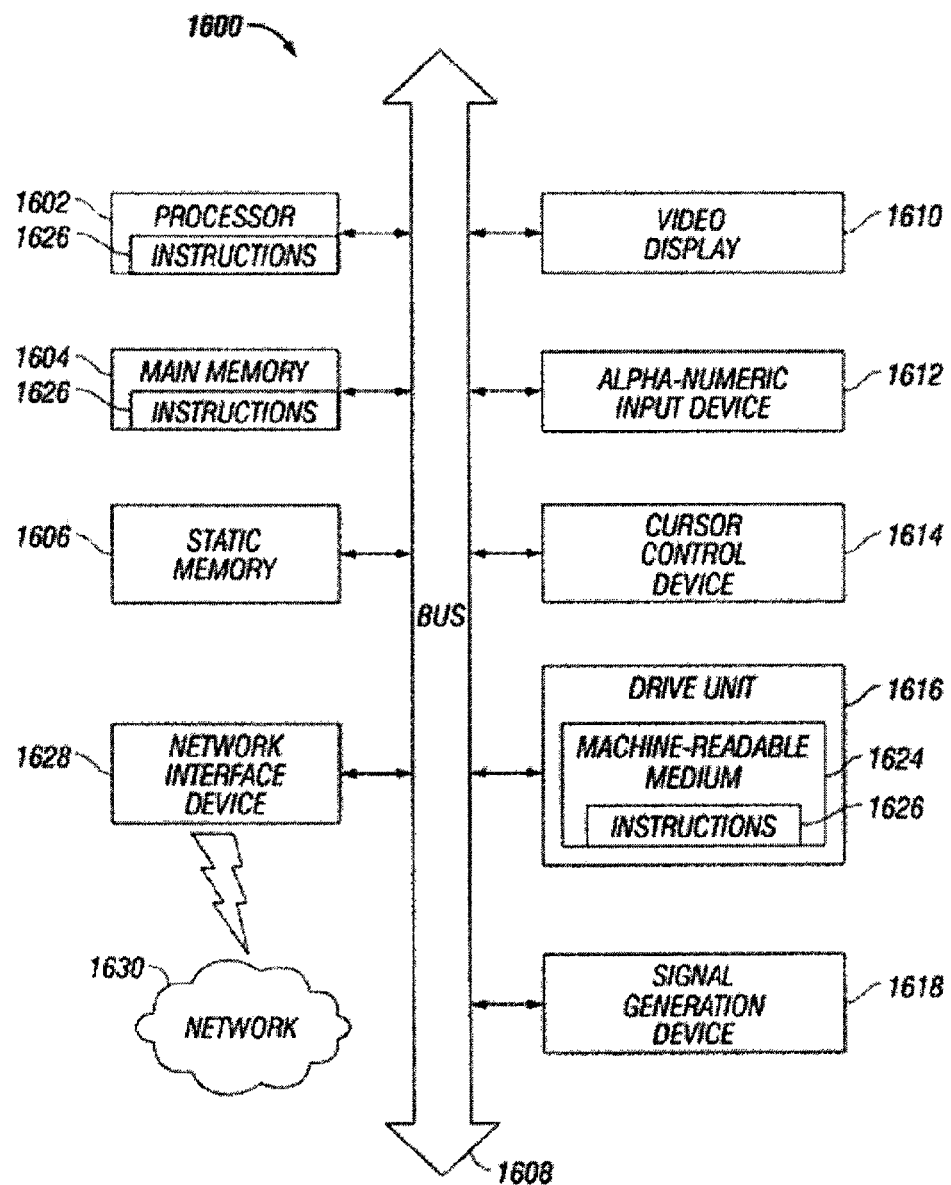
FIG. 4 is a block schematic diagram of a machine in the exemplary form of a computer system within which a set of instructions may be programmed to cause the machine to execute the logic steps according to an embodiment.

FIG. 4 is a block schematic diagram of a machine in the exemplary form of a computer system 1600 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A computer-implemented method of prioritizing and highlighting chat messages, comprising:

providing a processor configured for collecting user identification, comprising at least one of user identity, position title, organization, or machine identification;

said processor configured for allowing a user to receive a chat message from a sender;

scanning, by said processor, content of said chat message for matching keywords stored in permanent memory, the keywords including:

inferred keywords, previously stored in permanent memory as a result of an automatic analysis of previous chat message content and other historical factors; and entered keywords, previously stored in permanent memory as a result of manual entry or selection by a user or organization;

computing, by said processor, a keyword relevance score based on the number of matching keywords detected in the content of said chat message based on said scanning;

scanning, by said processor, content of said chat message for organization references including:

reference to at least one of said user's identity, position title, or organization; and priority of said sender derived from relationship of said user and said sender, based on:

said sender identification, said user identification, and stored organizational data including hierarchy; and computing, by said processor, an organization relevance score based on said organization references detected in the content of said chat message based on said scanning;

said processor configured for prioritizing and highlighting said chat message based on said keyword relevance score and organization relevance score, wherein said highlighting reflects importance and relevance of said chat message to said user.

2. The computer-implemented method of claim 1, further comprising:

said processor configured for adding particular data, upon said receiving a chat message, from said chat message to a chat history stored in permanent memory; and in response to said user sending an outgoing chat message, adding particular data from said outgoing chat message to said chat history;

wherein said particular data comprises at least one of:
said sender information;
content of said chat message;
destination chat room;
timestamp of receipt of said chat message; or
timestamp of transmission of said outgoing chat message; and wherein data from said chat history are used for at least one of:
inferring keywords by correlating content of said chat message with occurrence of immediately subsequent said outgoing chat message, constituting a reply from said user; or
inferring priority of said sender by correlating said sender information with occurrence of immediately subsequent said outgoing chat message, constituting a reply from said user.

3. The computer-implemented method of claim 2, wherein a priority senders list is generated for future reference.

4. The computer-implemented method of claim 1 wherein said highlighting comprises at least one of the following visual indications:
a font size that contrasts at least one predetermined font size;
pulsing or flashing text; or
a bar graph adjacent to said chat message.

5. The computer-implemented method of claim 4, wherein the color of said bar graph corresponds to the organization or group of the sender of said chat message.

6. The computer-implemented method of claim 4, wherein the length of said bar graph corresponds to presence of keywords.

7. The method of claim 1, wherein highlighting said chat message includes presenting an audible signal to said user upon receipt of said chat message.

8. A computer-implemented method of prioritizing and highlighting chat messages, comprising:

providing a processor configured for collecting user identification, comprising at least one of user identity, position title, organization, or machine identification;

said processor configured for allowing a user to receive a chat message from a sender;

scanning, by said processor, content of said chat message for matching keywords stored in permanent memory, the keywords including:
inferred keywords, previously stored in permanent memory as a result of an automatic analysis of previous chat message content and other historical factors; and entered keywords, previously stored in permanent memory as a result of manual entry or selection by a user or organization;

computing, by said processor, a keyword relevance score based on the number of matching keywords detected in the content of said chat message based on said scanning;

scanning, by said processor, content of said chat message for organization references including:
reference to at least one of said user's identity, position title, or organization; and
priority of said sender derived from relationship of said user and said sender, based on:
said sender identification,
said user identification, and
stored organizational data including hierarchy;

said processor configured for prioritizing and highlighting said chat message based on said keyword relevance score and organization relevance score, wherein said highlighting reflects importance and relevance of said chat message to said user; and based on said keyword score and organization relevance score, highlighting, by said processor, said chat message for presentation to said user with an audible signal that is actuated by the chat message and is intended to be heard by the user.

9. The method of claim 8, further comprising:
said processor configured for adding particular data, upon said receiving a chat message, from said chat message to a chat history stored in permanent memory; and
in response to said user sending an outgoing chat message, adding particular data from said outgoing chat message to said chat history;
wherein said particular data comprises at least one of:
said sender information;
content of said chat message;
destination chat room;
timestamp of receipt of said chat message; or
timestamp of transmission of said outgoing chat message; and
wherein data from said chat history are used for at least one of:
inferring keywords by correlating content of said chat message with occurrence of immediately subsequent said outgoing chat message, constituting a reply from said user; or
inferring priority of said sender by correlating said sender information with occurrence of immediately subsequent said outgoing chat message, constituting a reply from said user.

10. The method of claim 9, wherein a priority senders list is generated for future reference.

11. The method of claim 8, wherein said highlighting further comprises at least one of the following visual indications:
a font size that contrasts at least one predetermined font size;
pulsing or flashing text; or
a bar graph adjacent to said chat message.

12. The method of claim 11, wherein the color of said bar graph corresponds to the organization or group of the sender of said chat message.

13. The method of claim 11, wherein the length of said bar graph corresponds to presence of keywords.

14. A system for prioritizing and highlighting chat messages, comprising:
one or more processors; and memory associated with said one or more processors with instructions stored thereon, which when executed by the one or more processors, cause the system to:

collect user identification for a user, comprising at least one of user identity, position title, organization, or machine identification;

receive a chat message from a sender;

scan content of said chat message for matching keywords stored in memory, the keywords including:

inferred keywords, previously stored in permanent memory as a result of an automatic analysis of previous char message content and other historical factors; and entered keywords, previously stored in permanent memory as a result of manual entry or selection by a user or organization;

compute a keyword relevance score based on the number of matching keywords detected in the content of said chat message based on said scanning;

scan content of said chat message for organization references including:

reference to at least one of said user's identity, position title, or organization; and priority of said sender derived from relationship of said user and said sender, based on:

said sender identification, said user identification, and stored organizational data including hierarchy;

compute an organization relevance score based on said organization references detected in the content of said chat message based on said scanning; and prioritize and highlight said chat message based on said keyword relevance score and organization relevance score, wherein said highlighting reflects importance and relevance of said chat message to said user.

15. The system of claim 14, wherein the memory has further instructions stored thereon, which when executed by the one or more processors, cause the system to further:

add particular data, upon said receiving a chat message, from said chat message to a chat history stored in permanent memory; and in response to said user sending an outgoing chat message, add particular data from said outgoing chat message to said chat history;

wherein said particular data comprises at least one of:

said sender information;

content of said chat message;

destination chat room;

timestamp of receipt of said chat message; or timestamp of transmission of said outgoing chat message; and wherein data from said chat history are used for at least one of:

inferring keywords by correlating content of said chat message with occurrence of immediately subsequent said outgoing chat message, constituting a reply from said user; or inferring priority of said sender by correlating said sender information with occurrence of immediately subsequent said outgoing chat message, constituting a reply from said user.

16. The system of claim 15, wherein a priority senders list is generated for future reference.

17. The system of claim 14, wherein the instructions to highlight said chat message includes instructions to present an audible signal to said user upon receipt of said chat message.

18. The system of claim 14, wherein the instructions to highlight said chat message includes instructions to present one or more of the following visual indications:

a font size that contrasts at least one predetermined font size;

pulsing or flashing text; or a bar graph adjacent to said chat message.

19. The system of claim 18, wherein the color of said bar graph corresponds to the organization or group of the sender of said chat message.

20. The system of claim 18, wherein the length of said bar graph corresponds to presence of keywords.

* * * * *